United States Patent [19]

Kishida et al.

[11] 4,446,904
[45] May 8, 1984

[54] PNEUMATIC RADIAL TIRE HAVING HIGHLY DURABLE BEAD STRUCTURE

[75] Inventors: Katsuji Kishida, Osaka; Masakazu Oonishi; Keijiro Oda, both of Kawanishi, all of Japan

[73] Assignee: The Toyo Rubber Industry Co. Ltd., Osaka, Japan

[21] Appl. No.: 370,544

[22] Filed: Apr. 21, 1982

[30] Foreign Application Priority Data

May 1, 1981 [JP] Japan .................................. 56-67543

[51] Int. Cl.³ ........................ B60C 15/06; B60C 9/00; B60C 15/00
[52] U.S. Cl. ........................... 152/356 R; 152/357 R; 152/359; 152/362 R
[58] Field of Search ......... 152/362 R, 362 CS, 354 R, 152/355, 356 R, 357 R, 359, 360, 361 R, 361 FP, 361 DM, 374

[56] References Cited

U.S. PATENT DOCUMENTS

| | | | |
|---|---|---|---|
| 3,895,666 | 7/1975 | Inoue | 152/362 R |
| 3,902,542 | 9/1975 | Imamura et al. | 152/362 R X |
| 3,921,693 | 11/1975 | Suzuki et al. | 152/362 R |
| 4,046,183 | 9/1977 | Takahashi et al. | 152/362 R |
| 4,185,677 | 1/1980 | Motomura et al. | 152/362 R |
| 4,215,737 | 8/1980 | Motomura et al. | 152/362 R |
| 4,227,563 | 10/1980 | Grosch et al. | 152/362 R X |
| 4,289,184 | 9/1981 | Motomura et al. | 152/362 R X |
| 4,319,621 | 3/1981 | Motomura et al. | 152/359 X |

Primary Examiner—William A. Powell
Assistant Examiner—Thomas Bokan
Attorney, Agent, or Firm—Wenderoth, Lind & Ponack

[57] ABSTRACT

A pneumatic radial tire having highly durable bead structure is disclosed. A carcass ply layer of organic textile cords is turned up around a bead core from the inside to the outside. A reinforcing strip of steel cords is positioned outwardly adjacent to the turn-ups of carcass plies. An organic textile cord fabric is disposed outwardly adjacent to the reinforcing strip of steel cords. A bead filler of approximately triangular sectional shape is disposed at the region enclosed by the carcass plies, the turn-ups of the carcass plies and the reinforcing strip of steel cords. The bead filler comprises high hardness rubber stock and medium hardness rubber stock. A cap of organic textile cord fabric covers an upper end of the reinforcing strip of steel cords. A fin-shaped rubber buffer having a hardness lower than that of the medium hardness rubber stock by 3° to 20° is disposed radially outwardly of the capped end and axially outwardly adjacent to the medium hardness rubber stock.

1 Claim, 2 Drawing Figures

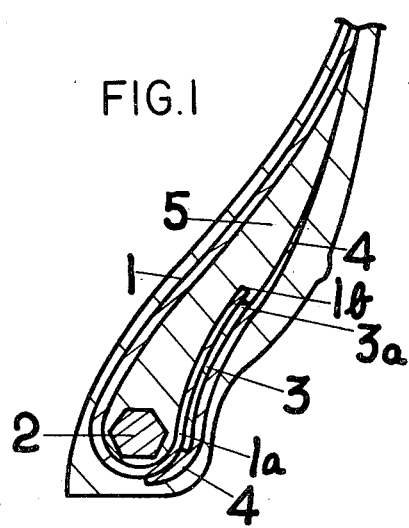
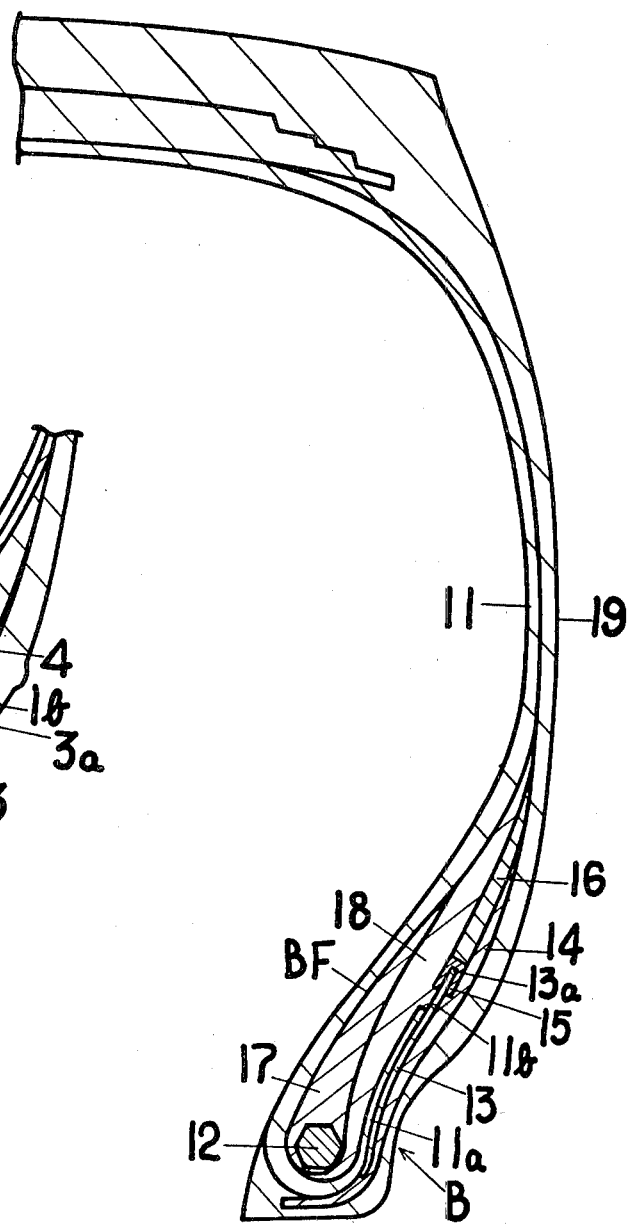

PNEUMATIC RADIAL TIRE HAVING HIGHLY DURABLE BEAD STRUCTURE

BACKGROUND OF THE INVENTION

1. Field of the Invention

This invention relates to an improvement of bead structure of a pneumatic radial tire having carcass plies made of organic fiber cords for heavy duty vehicles such as trucks, light small trucks, buses and so forth and more particularly to a fundamental improvement of the part between a bead region, whose deformation is suppressed by a rim flange, and a lower side region, which easily undergoes load deformation, to eliminate the occurence of separation failure.

2. Prior Art

In a conventional pneumatic radial tire for heavy duty vehicles, carcass plies of a tire are turned up around a bead core and terminate at a lower region of the side wall, and turn up regions (hereinafter "turn-ups") of the carcass plies are generally covered by a reinforcing strip of rubberized steel cords extending to a side wall. In such a structure, a great difference or dislocation in rigidity occurs between both at the ends of the turn-up of the carcass plies or at the upper end of the reinforcing strip of rubberized steel cords and surrounding rubber. The dislocation in rigidity generates a shearing stress due to tire deformation caused by repeated load stress resulting from the rotation of the tire. Consequently, separation occurs between the steel cords and surrounding rubber due to the shearing strain.

Some proposals have been made to overcome the problems. In the Japanese Patent Applications laid open under No. 53-119501 and No. 55-106806, high hardness rubber is so disposed adjacent to both ends of carcass ply turn-ups and of a reinforcing strip of metallic cords as to cover both ends so that the dislocation in rigidity occurring between the metallic cords and the surrounding rubber can be decreased so as to decrease the concentration of strain at the upper ends of the metallic cords and to prevent a separation.

According to the Japanese Utility Model publication No. 52-48482, wherein the upper end of a reinforcing layer of steel cords is covered with textile cord fabric so as to prevent the free upper end of the steel cords from being in contact with a surrounding rubber and thereby intended to suppress the inducement of separation and to eliminate a separation problem.

The above described proposals for preventing a separation are directed to obtaining a separation resistance structure by reinforcing the places liable to cause a separation. However, these proposals do not substantially solve the problem because the concentration points of stress are merely transferred to some other points so that a separation is induced in a different manner.

SUMMARY OF THE INVENTION

It is therefore an object of the present invention to provide a novel separation resistance structure wherein the shearing stress occurring in the structure can be dispersed and absorbed into a flexible member so as to eliminate strain in the bead portion and to prevent the occurrence of separation at the upper ends of carcass turn-ups and a reinforcing element.

A pneumatic radial tire according to the present invention comprises carcass plies of organic textile cords extending from one bead portion to another bead portion across a crown portion and disposed at an angle of 90° relative to the equatorial line of the tire, the opposite ends of the carcass plies being turned up around a respective annular bead core from the inside to the outside and terminating at the bead region, a reinforcing strip of steel cords positioned outwardly adjacent to the turn-ups of the carcass plies and extending toward the lower region of the side wall beyond the turn-ups, organic textile cord fabric disposed outwardly adjacent to the reinforcing strip of steel cords and extending from a radially inner side of the carcass plies at a bead base to a radially outward position beyond the upper end of the reinforcing layer of steel cords, a bead filler of approximately triangular sectional shape consisting of hard or high hardness rubber stock of approximately triangular sectional shape and medium hardness rubber stock positioned outwardly adjacent to the high hardness rubber stock, the bead filler being disposed at the region enclosed by the carcass plies, the turn-ups of the carcass plies and the reinforcing strip of steel cords with a top portion of the bead filler extending to an upper portion of the side wall, a cap of organic textile cord fabric covering an upper end of the reinforcing strip of steel cords and a fin-shaped rubber buffer having a hardness lower than that of the medium hardness rubber stock by 3° to 20° in Shore A hardness disposed radially outwardly of the capped end and outwardly adjacent to the medium hardness rubber stock.

As described above, the difference in hardness between the rubber buffer and the medium rigidity rubber is in the range of 3°–20° in Shore A hardness and preferably in the range of 5°–15°. The desirable range of the hardness of the rubber buffer is from 45° to 65° in Shore A hardness and that of the medium hardness rubber is from 55° to 70° in Shore A hardness. If the difference in the hardness between the rubber buffer and the medium hardness rubber is less than 3°, the effect for improving the durability of the bead region is small.

To make the difference in the hardness between both rubbers more than 20°, the hardness of the medium hardness rubber should be high and the hardness of the rubber buffer should be low. As a matter of fact, the larger the difference in the hardness between the two rubbers is, the more easily the stress disperses into the rubber buffer. In order to make the hardness of the rubber buffer small, however, the composition ratio of carbon black which is a reinforcing agent of a rubber component should be decreased. As a result, a rubber composition becomes inferior in thermal resistance. Conversely, to make high the hardness of the medium hardness rubber results in the decrease in flexural fatigue resistance to deteriorate the durability of the bead portion.

The medium hardness rubber stock of bead filler is preferably divided into two rubbers. A comparatively high hardness rubber is used adjacent to the high hardness rubber stock of bead filler having approximately triangular sectional shape, and a comparatively low hardness rubber is used adjacent to the rubber buffer while keeping the difference range of 3° to 20° higher than the hardness of the rubber buffer. Such an arrangement increases the stress dispersion efficiency of the rubber buffer.

The present invention is directed to a pneumatic radial tire which is used with high inflation pressure of more than 3 Kg/cm². For the carcass plies, organic textile cords such as polyester, aramide, and nylon are used. Polyester and aramide having a high Young's modulus are preferably used. Multi-layered carcass plies, generally two to five layered carcass plies, are employed. The radial dimension of the reinforcing strip of steel cords is settled 1.1 to 1.6 times as large as that of the turn-ups of the carcass plies.

BRIEF DESCRIPTION OF THE DRAWINGS

FIG. 1 is a cross-sectional view of the lower part of a side wall in a conventional tire.

FIG. 2 is a cross-sectional view of the right half of a tire showing one embodiment in accordance with the present invention.

DETAILED DESCRIPTION OF THE PREFERRED EMBODIMENT

In FIG. 1, reference numeral 1 designates carcass plies disposed at an angle of 90° with respect to the equatorial line of the tire extending from one bead portion to another bead portion, and turned up around a bead core 2 from the inside to the outside. A reinforcing strip of rubberized steel cords 3 is provided outside the turn-ups 1a of the carcass plies to increase the rigidity of the bead portion. A reinforcing layer of organic textile cords 4 is further provided outside the reinforcing strip of steel cords 3 extending to a radially outward position beyond the upper end of the reinforcing strip of the steel cords 3 to relieve the dislocation in rigidity which occurs at the upper end 3a of the reinforcing strip of steel cords 3. This structure aims at avoiding the separation both at the upper end 1b of the carcass plies and at the upper end 3a of the reinforcing strip of steel cords. A bead filler 5 of high hardness rubber is applied in the area enclosed by the carcass plies 1, their turn-ups 1a and the reinforcing layer of organic textile cords 4.

In such a conventional tire, the bead filler 5 of high hardness tends to move in accordance with the movement of the carcass plies, whereas the turn-ups 1a and the reinforcing layer of steel cords 3 are restrained from moving by a flange of the rim on which the tire is mounted, thereby causing a repeated shearing stress between the bead filler 5 and both upper ends 1b, 3a of the carcass turn-ups and of the reinforcing strip of steel cords. As a result, both upper ends are liable to be separated from the bead filler and the separation failure is induced.

Referring to FIG. 2 showing an embodiment of the present invention, reference numeral 11 designates multi-layered carcass plies of organic textile cords, disposed at an angle of 90° with respect to the equatorial line of the tire extending from one bead portion B to another bead portion B, the opposite ends of the carcass plies being turned up around the bead core 12 from the inside to the outside to form the turn-ups 11a. A reinforcing strip of steel cords 13 is provided outwardly adjacent to the turn-ups 11a and extends toward the lower region of the side wall beyond the upper end 11b of the turn-ups.

A reinforcing layer of organic fiber 14 is further provided outwardly adjacent to the reinforcing strip of steel cords 13, extending from a radially inner side of the carcass plies 11 positioned at a bead base to a radially outward position beyond the upper end 13a of the reinforcing strip of steel cords 13.

A bead filler BF is disposed at the area enclosed by the carcass plies 11, the turn-ups 11a and the reinforcing strip of the steel cords 13 with a top portion of the head filler BF extending to a side wall 19. Bead filler BF is so formed as to have an approximately triangular shape cross section and consisting of high hardness rubber stock 17 of triangular sectional shape and medium hardness rubber stock 18 positioned outwardly adjacent to the high hardness rubber stock 17.

The upper end 13a of reinforcing strip of the steel cords is covered with a cap 15 made of a rubberized cord fabric of organic textile cords such as nylon cords. Disposed radially outwardly of the capped end is a rubber buffer 16 sandwiched between the medium hardness rubber stock 18 and the reinforcing layer of textile cords 14.

In the bead structure according to the present invention, the reinforcing layer of steel cords 13 and the high hardness rubber stock 17 enhance the high rigidity of the bead portion and provide a high driving efficiency. When the lower portion of the side wall 19 undergoes a compressive stress under a loaded condition, the rubber buffer 16 is readily deformed depending on the magnitude of the produced stress and absorbs the exerted stress. Accordingly, the stress caused in the vicinity of the upper end 13a of the reinforcing strip of steel cords 13 is diminished so as to enhance the separation resistance and thus a highly durable bead structure is obtained.

A drum test was conducted on 10.00 R 20 tires of the general structure of the preferred embodiment of the present invention disclosed hereinabove. The detailed structure of the test tires is described hereunder. Three layered carcass plies of polyester cords are employed. Each of the opposite ends of the carcass plies are turned up around the bead core from the inside to the outside with each turn-up having different radial dimensions within the range of 18% of the tire sectional height, that is, the vertical dimensions from the bead heel to the crown outer surface. A reinforcing strip of steel cords is provided outwardly adjacent to the turn-ups of the carcass plies with steel cords inclined at an angle of 45° with respect to the radial direction of the tire.

The reinforcing strip of steel cords extend from the axially outward position of the bead core up to 23% of the tire sectional height. A reinforcing layer of organic textile cords comprising two pies of nylon cords is further provided outwardly adjacent to the reinforcing strip of steel cords extending from the radially inner side of the carcass plies at a bead base up to a radially outward position beyond the upper end of the reinforcing layer of steel cords. The upper end of the reinforcing strip of steel cords is covered with a cap made of 45° bias cut nylon cord fabric rubberized with a rubber compound having good adhesion to steel cords. A rubber buffer is disposed on the cap. The hardness of the rubber buffer is indicated in a table below. High hardness rubber stock of hardness 80° and medium hardness rubber stock having a hardness shown in the table are disposed at the area enclosed by the carcass plies, the turn-ups of carcass plies and the reinforcing strip of steel cords, to form an approximately triangular shaped bead filler which extends to the side wall.

Drum tests for durability were conducted upon the tires constructed as above by comparing the running distance of each test tire until the separation occurs at the bead portion.

The test results are shown in the table below. High loading conditions were used, namely an inflation pressure of 9 kg/cm$^2$, a load of 1,340 kg and a running speed of 40 km/hr.

|  | EMBODIMENT | | | | | | | | COMPARISON | | |
| --- | --- | --- | --- | --- | --- | --- | --- | --- | --- | --- | --- |
|  | Test tire No. | | | | | | | | | | |
|  | 1 | 2 | 3 | 4 | 5 | 6 | 7 | 8 | 9 | 10 | 11 |
| Rubber buffer (hardness) | 45 | 50 | 50 | 55 | 55 | 60 | 60 | 62 | 62 | 70 | 80 |
| Medium rigidity rubber (hardness) | 55 | 65 | 70 | 60 | 65 | 65 | 70 | 65 | 62 | 70 | 70 |
| Difference in hardness | 10 | 15 | 20 | 5 | 10 | 5 | 10 | 3 | 0 | 0 | −10 |
| Durability (index) | 150 | 250 | 200 | 250 | 250 | 200 | 200 | 150 | 100 | 95 | 70 |
| Damage | Bead sepa | Stopped | Bead sepa | Stopped | Stopped | Bead sepa | Bead sepa | Bead sepa | Bead sepa | Bead sepa | Bead sepa |

The respective results, that is, running distances, are represented for comparison by means of an index by setting a distance of test tire No. 9 to be 100. "Bead sepa" indicated in the damage ion in the table means the occurrence of the separation at the bead portion. "Stopped" in the same row means that the tests were discontinued because no damage occurred at the bead region when the running distance of the tires was 2.5 times as long as that of the standard test tire No. 9.

The drum tests show that the running distance of the embodiment tires No. 1–No. 8 is longer than that of the comparison tires with conventional structure until the separation damage occurs at the bead region. Especially, the test tires Nos. 2, 4 and 5 having a hardness difference of 5° to 15° between the rubber buffer and the medium hardness rubber stock are so durable in the bead regions that no damage occurs in the running distance 2.5 times as long as that of the test tire No. 9. The tests also reveal that, as shown in the table, for the tires having a hardness difference of 3° to 20° between the rubber buffer and the medium hardness rubber stock this hardness difference shows considerable effect for enhancing the durabilities in the bead regions.

The tests also indicate that, as shown in the comparison tire No. 11, the running distance of a tire in which the hardness of rubber buffer is higher than that of medium hardness rubber is shorter than that of the comparison tire No. 9.

Also recognized from the results shown in the table, the preferable ranges of the hardness of the rubber buffer and that of the medium hardness rubber is 45° to 65° and 55° to 70°, respectively. If the hardness of the medium hardness rubber is more than 70°, the running distance of the tires would become rather short.

Summing up the tests results, the tire having the bead structure described before an accordance with the present invention wherein the rubber buffer has a hardness lower than that of the medium hardness rubber by 3° to 20° can attain a remarkable, more than expected improvement in durability.

What is claimed is:

1. In a pneumatic radial tire having an annular side wall, an annular bead portion having a lower base including an annular bead core, beneath the side wall, and an annular crown portion above the side wall, the improvement comprising:
    a carcass ply layer of organic textile cords extending from the bead portion across the crown portions at an angle of 90° relative to the equatorial line of the tire, the lower end of said carcass ply layer being turned up around the annular bead core from the inside to the outside of the tire and terminating within the bead portion to form a turned-up portion of said carcass ply layer;
    a reinforcing strip of steel cords positioned outwardly of and adjacent to said turned-up portion of said carcass ply layer, having a top end extending radially outwardly, above said turned-up portion;
    an organic textile cord fabric disposed outwardly adjacent said reinforcing strip and extending from a radially inner side of said carcass ply layer at the lower base of the bead portion to a lower region of the side wall above said reinforcing strip;
    a bead filler of approximately triangular sectional shape having an upper end extending to the side wall;
    said bead filler consisting of high hardness rubber stock of approximately triangular sectional shape and medium hardness rubber stock positioned outwardly of and adjacent to said high hardness rubber stock and being enclosed by said carcass ply layer including said turned-up portion thereof, and said reinforcing strip;
    a cap of organic textile cord fabric covering the upper end of said reinforcing strip; and
    a rubber buffer fin-shaped in section, having a hardness lower than said medium hardness stock by 3° to 20° Shore A hardness, disposed radially outwardly of said upper end of said reinforcing strip and axially outwardly of and adjacent to said medium hardness rubber stock.

* * * * *